US008250047B2

(12) United States Patent (10) Patent No.: US 8,250,047 B2
McKenney et al. (45) Date of Patent: Aug. 21, 2012

(54) HYBRID MULTI-THREADED ACCESS TO DATA STRUCTURES USING HAZARD POINTERS FOR READS AND LOCKS FOR UPDATES

(75) Inventors: Paul E. McKenney, Beaverton, OR (US); Maged M. Michael, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1851 days.

(21) Appl. No.: 11/134,484

(22) Filed: May 20, 2005

(65) Prior Publication Data

US 2006/0265373 A1 Nov. 23, 2006

(51) Int. Cl.
*G06F 7/00* (2006.01)
*G06F 17/00* (2006.01)
(52) U.S. Cl. ........................................................ 707/704
(58) Field of Classification Search .................... 707/704
See application file for complete search history.

(56) References Cited

U.S. PATENT DOCUMENTS

| 5,230,061 | A | | 7/1993 | Welch | |
|---|---|---|---|---|---|
| 5,404,488 | A | * | 4/1995 | Kerrigan et al. | 711/133 |
| 6,003,123 | A | * | 12/1999 | Carter et al. | 711/207 |
| 6,601,120 | B1 | * | 7/2003 | Schimmel | 710/107 |
| 6,625,601 | B1 | * | 9/2003 | Molloy | 1/1 |
| 6,763,447 | B2 | | 7/2004 | Hersh et al. | |
| 2004/0107227 | A1 | | 6/2004 | Michael | |

OTHER PUBLICATIONS

Maged M. Michael, High performance dynamic lock-free hash tables and list-based sets, Proceedings of 14th Annual ACM Symposium on parallel algorithms and architectures, Winnipeg, Manitoba, Canada, pp. 73-82 (year 2002).
M.M. Michael, "Safe memory reclamation for dynamic lock-free objects using atomic reads and writes," in Procs. of 21st Annual ACM Symp. on Principles of Distributed Computing (Aug. 2002).
M. Herlihy et al., "The repeat offender problem: A mechanism for supporting dynamic-sized, lock-free data structures," in Procs. of 16th Int'l Symp. on Distributed Computing (Oct. 2002).

* cited by examiner

*Primary Examiner* — Van Oberly
(74) *Attorney, Agent, or Firm* — Steven L. Bennett

(57) ABSTRACT

Hybrid multi-threaded access to data structures is provided in which hazard pointers are used for reads and locks are used for updates. Where a reader is attempting to read a data structure, the reader maintains a hazard pointer to the data structure before reading it, without globally acquiring a lock on the data structure. Upon the reader being finished reading the data structure, it removes the hazard pointer from the data structure. Where an updater is attempting to update the data structure, the updater globally acquires a lock on the data structure before updating it. Upon the updater being finished updating the data structure, it releases the lock from the data structure. To delete the data structure, first it is determined whether any hazard pointers point to the data structure, and where no hazard pointers do, the data structure is deleted.

20 Claims, 7 Drawing Sheets

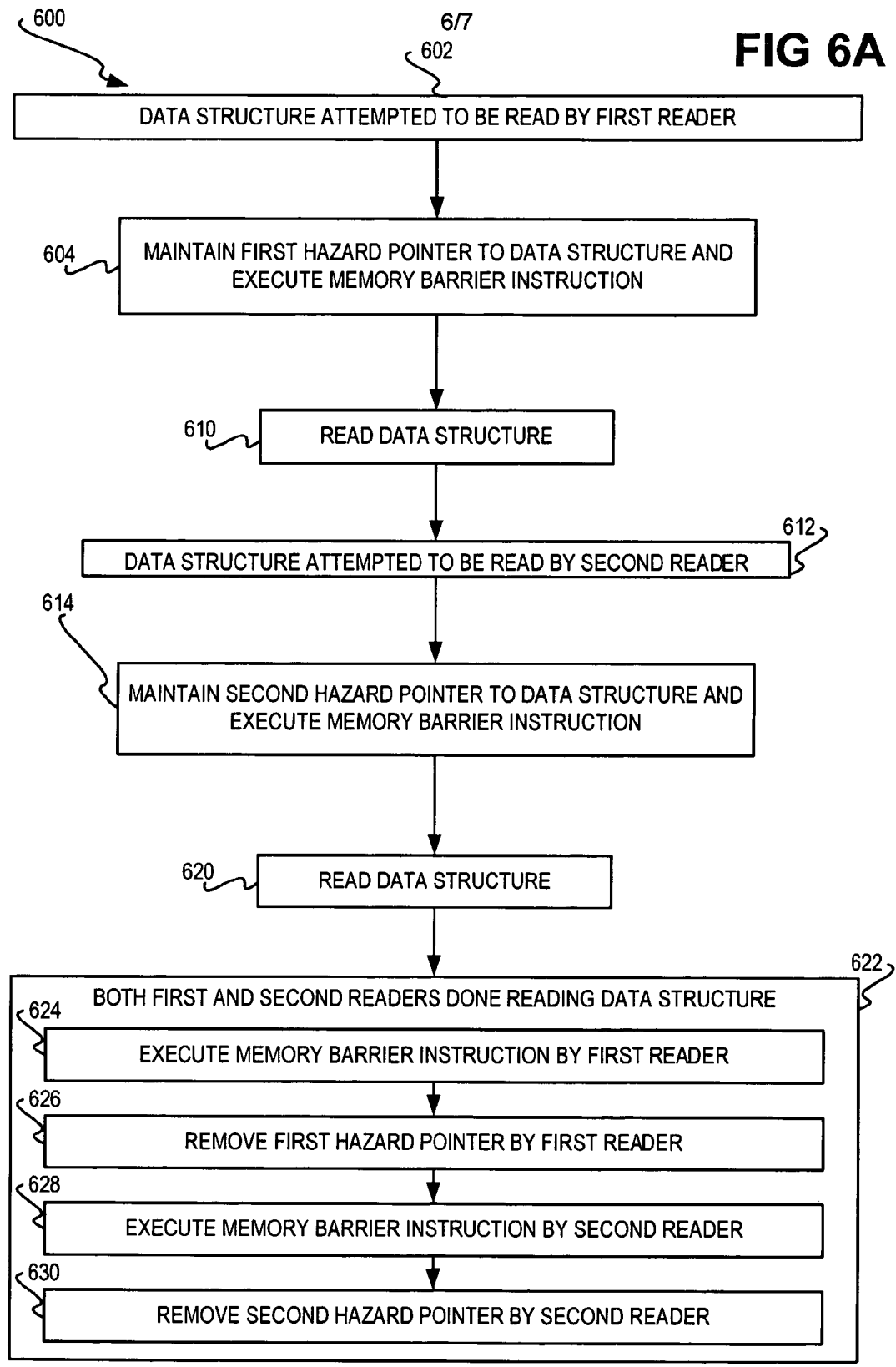

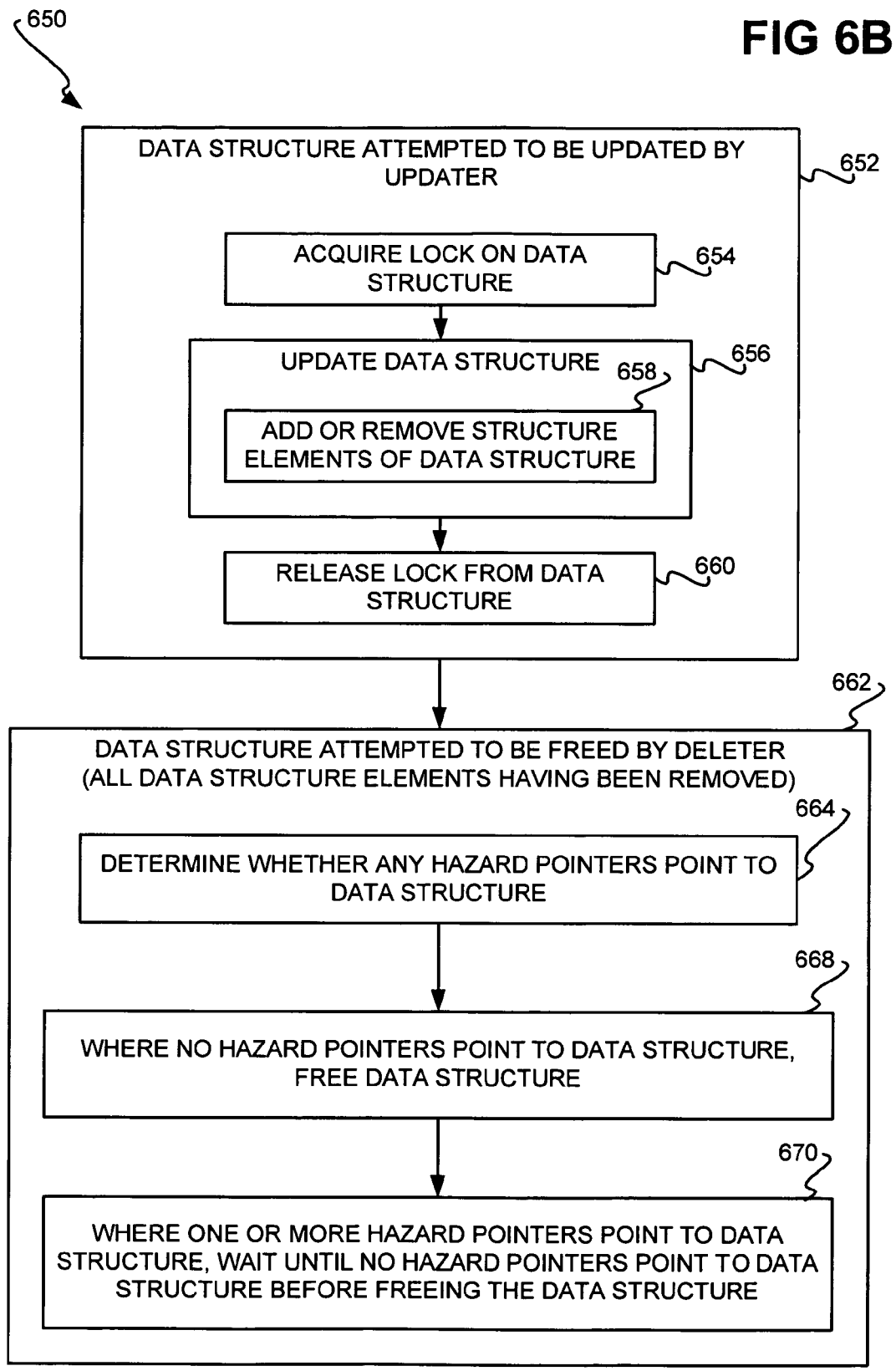

HYBRID MULTI-THREADED ACCESS TO DATA STRUCTURES USING HAZARD POINTERS FOR READS AND LOCKS FOR UPDATES

FIELD OF THE INVENTION

The present invention relates generally to multi-threaded access to data structures, and more particularly to such multi-threaded access in which hazard pointers are used when reading the data structures and locks are used when the data structures are updated.

BACKGROUND OF THE INVENTION

Historically, computers, including computing systems and computing devices, were single-threaded. This means that at any given time, only one computer program, or task, or thread, was being executed. If a given thread was accessing a particular data structure, the thread did not have to be concerned that other threads, or other tasks or programs, were also accessing the data structure. Therefore, the thread could read and update the data structure as desired.

More recently, multi-threaded computers have become popular. Multi-threaded computers include single-processor systems that provide for multitasking, which allow for more than one thread, task, or program to be running at the same time, with the processor switching between executions of a number of different tasks over time. Multi-threaded computers also include multiple-processor systems, in which multiple threads, tasks, and programs are concurrently running.

In multi-threaded systems, a given thread, program, or task, cannot be guaranteed that it is the only reader or updater of a particular data structure. For example, two or more threads may be reading the same data structure at the same time, two or more threads may be updating the same data structure at the same time, and/or one thread may be reading a data structure while another thread is concurrently updating the data structure. Updating a data structure may include creating a new data structure, modifying an existing data structure, or deleting an existing data structure. Data structures can include data objects, arrays, tables, lists, and other types of structures. A reader of a data structure is a thread, program, task, or other computer program code that is reading the data structure. An updater of a data structure is a thread, program, task, or other computer program that is updating the data structure.

Within multi-threaded systems, threads, programs, or tasks, have to engage in some type of overhead operation to ensure that other threads, programs, or tasks do not update the data structure while they are reading or updating it. One common type of mechanism in this respect is the lock. A reader, for example, may read-acquire a lock on a data structure before reading the data structure, to ensure that updaters do not try to update the data structure until the reader has finished reading it and has released the lock. It is noted that the terminology "read-acquiring a lock" means that a lock is being acquired for the purposes of reading data, whereas "write-acquiring a lock" means that a lock is being acquired for the purposes of writing data. Thus, an updater, by contrast, may write-acquire a lock on a data structure before updating the data structure, to ensure that readers do not try to read the data structure and other updaters do not try to update the data structure until it has finished performing its update to the data structure.

Locking mechanisms can be disadvantageous to employ, as they require threads, programs, and tasks to engage in sometimes significant overhead operations to acquire the locks, maintain them, and release the locks. For example, if a thread forgets to release a lock, the data structure that is the subject of the lock may not be able to be updated by other threads, and may not be able to be deleted (i.e., freed, in that the memory allocated to the data structure may not be able to be freed for other purposes). The net result can be that the computer system in which the data structure is present suffers performance penalties, or, worse, crashes.

Another type of mechanism to ensure that a given thread, program, or task maintains access to a desired data structure is the hazard pointer. The hazard pointer methodology does not employ locks. Rather, this methodology associates a number of single-writer multiple-reader shared pointers, called hazard pointers, with each thread that intends to access a given data structure. A hazard pointer either has a NULL value or points to a data structure.

The hazard pointer may be accessed later by its owning thread without further validation that the reference to the data structure is still valid. That is, once a thread has referenced a data structure with a hazard pointer, it is guaranteed that the data structure will not be deleted (i.e., freed) until the hazard pointer has been removed. Each hazard pointer can be written only by its owning thread, but can be read by other threads. One type of hazard pointer methodology that can be used is that described in the reference Maged M. Michael, "Hazard Pointers: Safe Memory Reclamation for Lock-Free Objects," IEEE Transactions on Parallel and Distributed Systems, Vol. 15, No. 6, June 2004, pp. 491-504.

Hazard pointers can be disadvantageous, however, because they require memory barriers. A memory barrier is an explicit instruction to a processor that causes the processor to order read and writes to memory. That is, a memory barrier is more precisely a memory barrier instruction that places constraints on the order of execution of other instructions, such as read and write instructions. As such, the processor cannot reorder read or write accesses (i.e., memory loads and stores) across the memory barrier.

For example, a section of code may include three read or write instructions, followed by a memory barrier instruction, followed by another three read or write instructions. A processor executing this section of code may reorder the execution of the first three read or write instructions relative to one another, and may reorder the execution of the last three read or write instructions relative to one another. However, because of the memory barrier instruction, the processor is not allowed to reorder the first three read or write instructions relative to the last three read or write instructions, and vice-versa. The memory barrier instruction thus prevents the processor from moving read or write instructions across the memory barrier, such that it is guaranteed that all of the first three read or write instructions are executed before any of the last three read or write instructions is executed. Utilizing memory barriers can affect performance, because processors are not able to use all of its optimizations, particularly read and write access (i.e., memory load and store) reordering, to increase execution speed of threads, programs, and tasks.

It is noted that hazard pointers are implemented in a completely different way than non-blocking synchronization mechanisms are. The programming code overhead needed to implement hazard pointers, in other words is very much different than the programming code overhead needed to implement non-blocking synchronization mechanisms. As a result, to those skilled in the art, hazard pointers are considered to not be employed in applications in which locks are also used, such that hazard pointers are considered to be mutually exclusive with locks. In general, those of ordinary skill within the art have divided approaches to manage multiple accesses to data structures into two broad classes: lock-based approaches, and lock-free approaches, and consider these two classes mutually exclusive with one another. The use of hazard pointers in particular is a lock-free approach.

With any type of approach used to manage multiple accesses to data structures, there are advantages and disadvantages. Some disadvantages of locks and hazard pointers have been noted above. Currently, a programmer has to select either a lock-based approach or a lock-free approach to manage multiple accesses to data structures. He or she cannot "pick and choose" among the approaches to attempt to leverage the advantages of various approaches and minimize their disadvantages. As such, the programmer is constrained to having his or her code burdened with predetermined disadvantages in managing multiple accesses to data structures, due to the inability of the programmer to combine both lock-based approaches and lock-free approaches to managing multiple accesses to data structures.

For this and other reasons, therefore, there is a need for the present invention.

SUMMARY OF THE INVENTION

The present invention relates to having hybrid multi-threaded access to data structures, using hazard pointers for reading the data structures and using locks for updating the data structures. In one method of the invention, where a reader is attempting to read a data structure, the reader maintains a hazard pointer to the data structure before reading the data structure, without globally acquiring a lock on the data structure. Upon the reader being finished reading the data structure, the reader removes the hazard pointer from the data structure.

Conversely, where an updater is attempting to update the data structure, the updater globally acquires a lock on the data structure before updating the data structure. Upon the updater being finished updating the data structure, the updater releases the lock from the data structure. Thus, this method of the invention novelly employs both a lock-based approach and a non-read-copy-update lock-free approach to managing multiple accesses to data structures. Readers use hazard pointers in a lock-free manner, whereas updaters use locks in a lock-based manner.

In another method of the invention, where a reader thread is attempting to read a data structure, it causes a hazard pointer to reference the data structure before reading the data structure, without acquiring a global lock on the data structure. Upon the reader thread being finished reading the data structure, it removes the hazard pointer from the data structure. Where an updater thread is attempting to update the data structure, it acquires a global lock on the data structure before updating the data structure. Upon the updater thread being finished updating the data structure, it releases the global lock from the data structure.

A system of the invention includes at least one processor, memory in which a data structure is stored, at least one reader thread executed by the processor from the memory, and at least one updater thread executed by the processor from the memory. Each reader thread is to maintain a hazard pointer to the data structure before reading the data structure, without globally acquiring a lock on the data structure, and is to remove the hazard pointer from the data structure after reading the data structure. Each updater thread is to globally acquire a lock on the data structure before updating the data structure, and is to release the lock from the data structure after updating the data structure.

Another system of the invention includes memory in which a data structure is stored. The system includes means for maintaining a hazard pointer reference the data structure before reading the data structure without acquiring a global lock on the data structure, and for removing the hazard pointer from the data structure after reading the data structure. The system also includes means for acquiring a global lock on the data structure before updating the data structure, and for releasing the global lock from the data structure after updating the data structure.

An article of manufacture of the invention includes a computer-readable medium. The computer-readable medium may be a recordable data storage medium, a modulated carrier signal, or another type of computer-readable medium. There is means in the medium for maintaining a hazard pointer pointing to the data structure before reading the data structure without acquiring a global lock on the data structure, and for pointing the hazard pointer to a NULL value after reading the data structure. There is also means in the medium for acquiring a global lock on the data structure before updating the data structure, and for releasing the global lock from the data structure after updating the data structure. There is further means in the means for deleting (i.e., freeing) the data structure after first determining that no hazard pointers point to the data structure and that no global locks are currently acquired on the data structure.

Embodiments of the invention provide for advantages over the prior art. Unlike the prior art, which requires in a mutual exclusive manner either a lock-free approach or a lock-based approach to managing multiple accesses to data structures, embodiments of the invention combine a lock-free approach, specifically hazard pointers, for reading data structures, and a lock-based approach, using locks, for updating data structures. As such, embodiments of the invention leverage the advantages of hazard pointers, which do not require the overhead of locks, when performing reads, with the advantages locks, which can offer greater performance, when performing writes.

That is, the disadvantages of locks and hazard pointers when used alone are minimized by using both of them in a hybrid manner. For data structures especially that are read more often than they are updated, the hybrid approach to multiple accesses to such data structures is advantageous. This is because programmers do not need to maintain the overhead associated with locks when performing reads, but still obtain the performance benefit associated with locks when performing writes. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 6A and 6B are flowcharts of methods for reading a data structure, in the case of the method of FIG. 6A, and for updating and deleting (i.e., freeing) a data structure, in the case of the method of FIG. 6B, according to varying embodiments of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
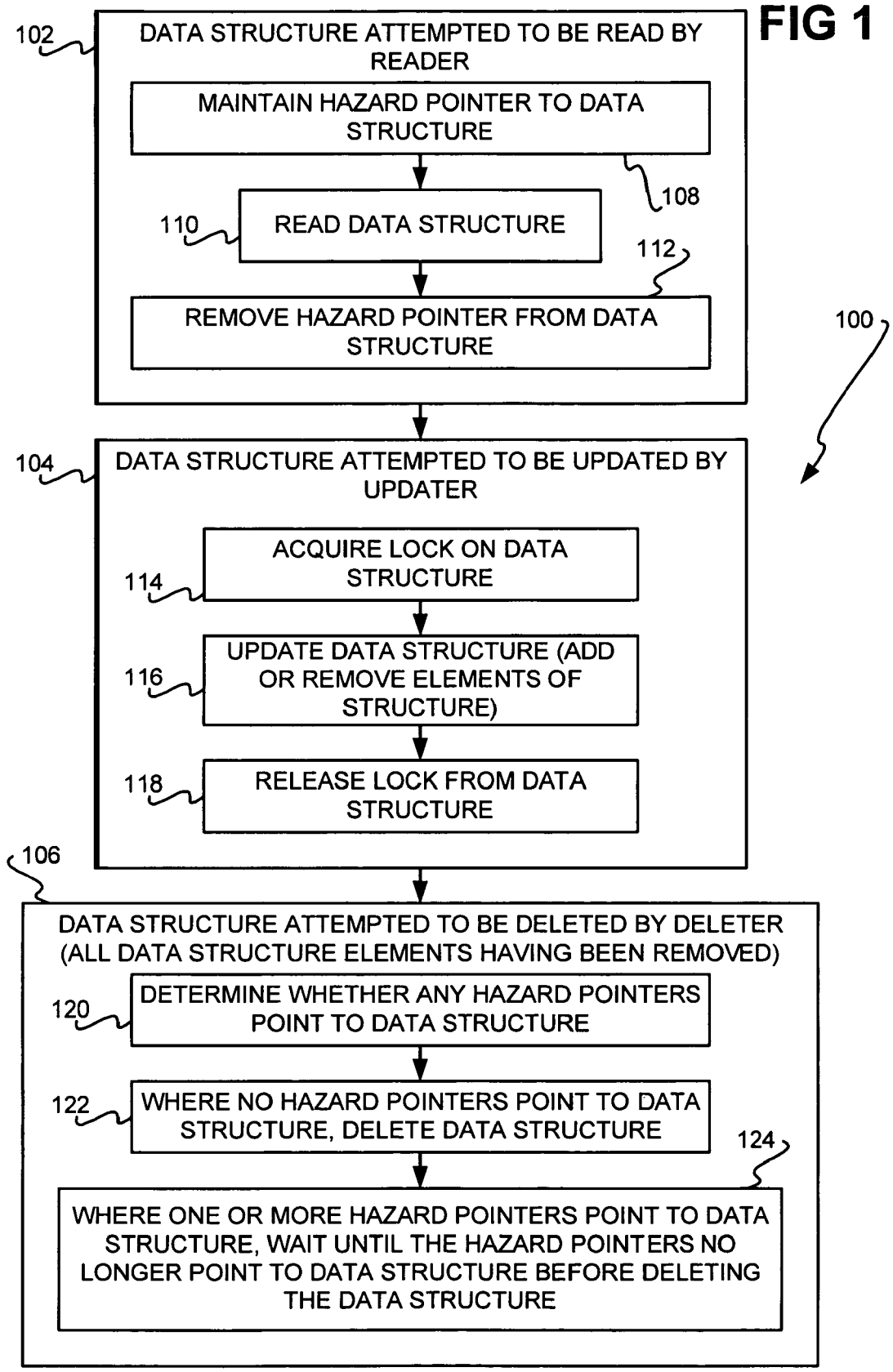
FIG. 1 is a flowchart of a method for using both hazard pointers and locks to manage multiple accesses to a data structure, according to an embodiment of the invention, and is suggested for printing on the first page of the patent.

FIG. 1 shows a method 100 for managing multiple accesses to a data structure using both hybrid pointers and locks, according to an embodiment of the invention. The data structure that is the subject of the method 100 may be an object, an array, a list, a table, or another type of data structure. The method 100 includes three basic parts: the data structure attempted to be read by a reader (102); the data structure attempted to be updated by an updater (104); and, the data structure attempted to be deleted (i.e., freed) by a deleter (106). The reader, the updater, and the deleter may each be a thread, a task, a computer program, or another type of computer program code to perform its respective functionality of reading, updating, or deleting. For descriptive convenience, throughout this patent application the terminology thread is used in a general and all-encompassing sense, such that usage of the term thread is also meant to encompass any other type of computer program code as well, such as a task, and so on.

Reading the data structure encompasses accessing the data structure for read purposes such that the data structure is not modified while it is being accessed. To read the data structure, a reader, such as a reader thread, maintains a hazard pointer to the data structure (108). That is, the reader causes a hazard pointer of which it is the owning thread to reference the data structure. The reader does not have to globally lock the data structure; stated another way, the reader does not have to acquire a global lock on the data structure. The reader then reads the data structure as desired (110). It is noted that reading the data structure may encompass acquiring local locks on particular elements of the data structure. (For instance, the data structure may have a number of data structure elements—e.g., if the data structure is an array, the data structure elements are the individual array items of the array.) Once the reader has finished reading the data structure, it removes the hazard pointer from the data structure (112). That is, the reader removes the hazard pointer from the data structure, by, for instance, pointing the hazard pointer to a NULL value.

Updating the data structure encompasses creating or modifying the data structure for write purposes such that the data structure is changed while it is being accessed. To update the data structure, an updater, such as an updater thread, acquires a global lock on the data structure (114). The updater then updates the data structure as desired (116). Updating the data structure can encompass adding or removing elements from the data structure. It is noted that in one embodiment, updates to a data structure are accomplished by creating a copy of the data structure, updating or changing the copy of the data structure as desired, substituting the copy of the data structure for the original data structure, and then deleting the original data structure. Once the updater has finished updating the data structure, it releases the lock from the data structure (118).

Deleting a data structure element involves freeing the memory allocated to the data structure element in one embodiment. Prior to deletion of the data structure, all of the elements of the data structure should be removed by appropriately updating the data structure in 114, 116, and 118. To delete the data structure, a deleter, such as a deleter thread, first determines whether any hazard pointers point to the data structure (120). That is, the deleter thread determines whether any readers are currently reading the data structure and thus referencing the data structure with hazard pointers. Where no hazard pointers point to, or reference, the data structure, the data structure is deleted (122) and the memory allocated to the data structure is freed. This can involve acquiring a lock on the data structure before deleting the data structure, to ensure that no updates are attempted of the data structure while it is being deleted, and then releasing the lock after deletion. Where one or more hazard pointers point to, or reference, the data structure, the deleter waits until the hazard pointers no longer point to the data structure before deletion (124).

It is noted that in some embodiments of the invention, memory barriers may be used in conjunction with the method 100 of FIG. 1, as is described in detail later in the detailed description. However, other embodiments of the invention may not require memory barriers. For instance, computing systems having sequentially consistent memory models are one type of computing system that does not need memory barriers. Furthermore, it is noted that whereas the method of FIG. 1 has been described in relation to an entire data structure being deleted, it may also be performed with respect to an element of the data structure being deleted, such that the element is first removed as an update, and then it is deleted by its allocated memory being freed.

Technical Background and Description

Figure 2:
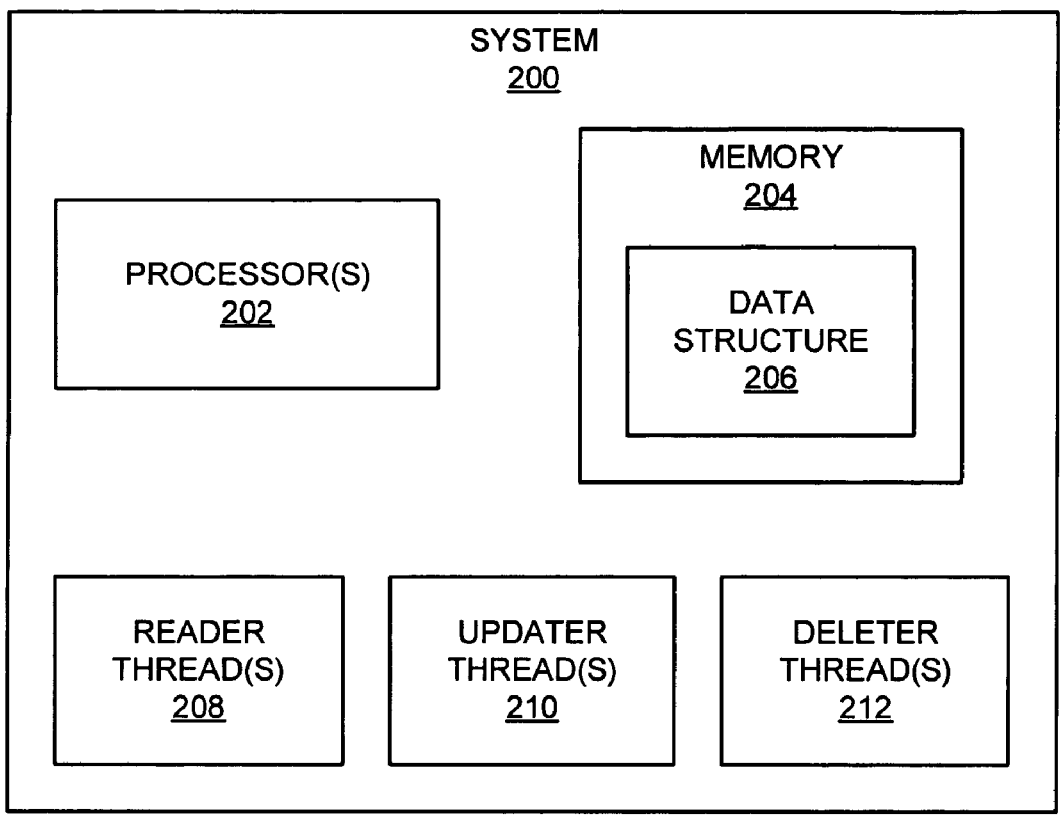
FIG. 2 is a diagram of a system including reader threads, updater threads, and deleter threads, according to an embodiment of the invention.

FIG. 2 shows a system 200, according to an embodiment of the invention. The system 200 includes one or more processors 202, and memory 204. As can be appreciated by those of ordinary skill within the art, the system 200 may include components in addition to and/or in lieu of those depicted in FIG. 2. The system 200 may be a single computer or computing device, or may encompass multiple computers, computing devices, or nodes. In a multiple-node system, the processors 202 may be divided among the various nodes, such that each node includes one or more of the processors 202.

The memory 204 stores a data structure 206. As has been described, the data structure 206 may be an object, an array, a list, a table, or another type of data structure. There are three types of threads depicted in the system 200: one or more reader threads 208, one or more updater threads 210, and one or more deleter threads 212. As has been noted, as used herein a thread refers to any type of computer program code, such as a thread, a task, a computer program, a computer program section, and the like. The reader threads 208 each read the data structure 206 as described herein. The updater threads 210 each update the data structure 206 as described herein. The deleter threads 212 each delete, or free memory allocated to, the data structure 206 as described herein.

Furthermore, a given thread may be a reader thread, an updater thread, or a deleter thread at different points in time. For example, a given thread may first read the data structure 206, at which time it is a reader thread for purposes of this patent application. Thereafter, the thread may update the data structure 206, at which time it is an updater thread for purposes of this patent application. Similarly, the thread may delete, or free the memory allocated to, the data structure 206, at which time it is a deleter thread for purposes of this patent application. The threads 208, 210, and 212 are specifically executed by one or more of the processors 202 from the memory 204, although this is not particularly depicted in FIG. 2 for illustrative clarity.

Figure 3A:
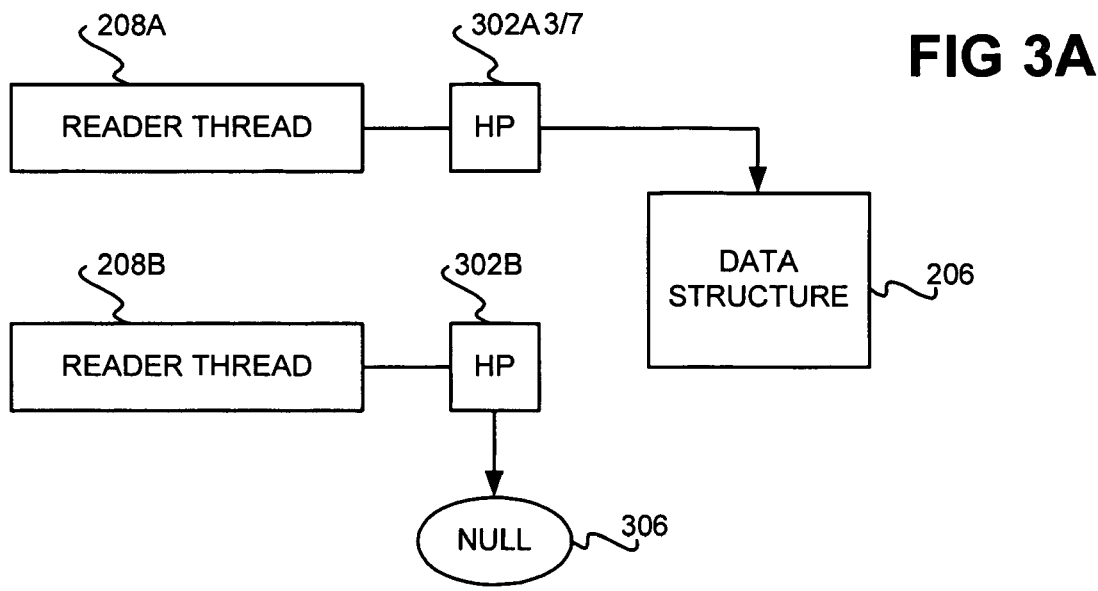
FIGS. 3A, 3B, and 3C are diagrams illustrating the utilization of hazard pointers and memory barriers for reading a data structure, according to an embodiment of the invention.
Figure 3B:
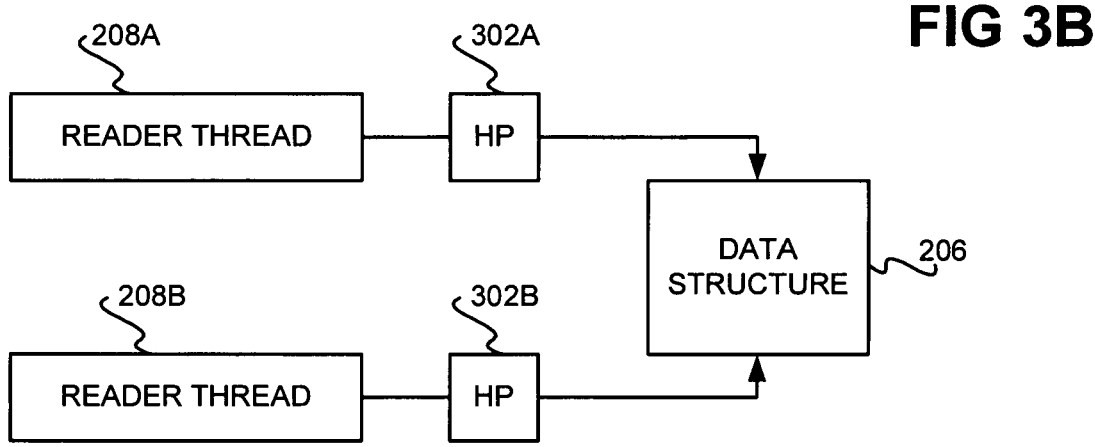
Figure 3C:
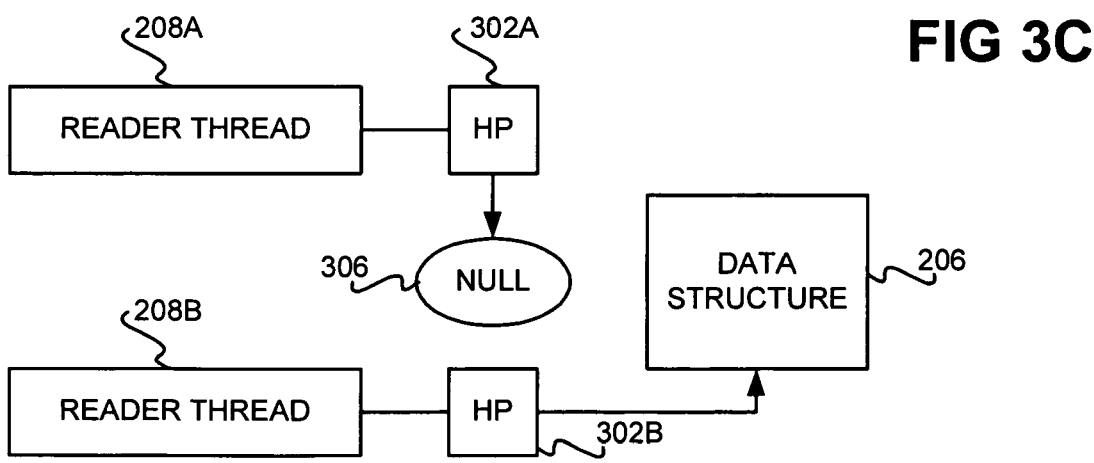

FIGS. 3A, 3B, and 3C show in an illustrative manner the utilization of hazard pointers to read the data structure 206, according to an embodiment of the invention. As has been described, the hazard pointer methodology does not employ locks. Rather, this methodology associates a number of single-writer multiple-reader shared pointers, called hazard pointers, for the reader threads 208 that intend to access to the data structure 206. Each hazard pointer either has a NULL value or points to the data structure 206. Once a reader thread has referenced the data structure 206 with a hazard pointer, it is guaranteed that the data structure 206 will not be deleted (or freed) until the hazard pointer has been removed. Each hazard pointer can be written only by its owning thread, but can be read by other threads. The hazard pointer methodology is more particularly described in the previously noted and incorporated reference, "Hazard Pointers: Safe Memory Reclamation for Lock-Free Objects."

In FIG. 3A, the reader thread 208A is the owning thread of a hazard pointer 302A, whereas the reader thread 208B is the owning thread of a hazard pointer 302B. The reader thread 208A is reading the data structure 206, such that the hazard pointer 302A references, or points to, the data structure 206. By comparison, the reader thread 208B is not reading the data structure 206, such that the hazard pointer 302B does not reference, or point to, the data structure 206, but rather points to the NULL value 306.

The utilization of hazard pointers can require memory barriers. As has been described, a memory barrier is an explicit instruction to one or more of the processors 202 that orders read and writes to memory. As such, the relevant processors 202 cannot reorder read or write accesses across the memory barrier instruction. Because the reader thread 208A has the hazard pointer 302A pointing to the data structure 206, it thus executes an associated memory barrier instruction after setting up the hazard pointer 302A.

In FIG. 3B, the reader thread 208B is also reading the data structure 206, in addition to the reader thread 208A. Because reading is a type of access that does not change, modify, or delete (i.e., free) the data structure 206, more than one reader thread can thus read a given data structure at a given time. The reader thread 208B has the hazard pointer 302B point to or reference the data structure 206 to read the data structure 206. As a result, the reader thread 208B also executes an associated memory barrier instruction after setting up the hazard pointer 302A. As before, the reader thread 208A has the hazard pointer 302A pointing to the data structure 206, too.

In FIG. 3C, the reader thread 208A no longer is reading the data structure 206. Therefore, the reader thread 208A executes a memory-barrier instruction and then removes the hazard pointer 302A from the data structure 206, so that the hazard pointer 302A no longer points to the data structure 206 and instead can, for example, point to the NULL value 306. The memory-barrier instruction is executed by the reader thread 208A in the context of FIG. 3C so that any outstanding read requests by the reader thread 208A are not reordered past the removal of the hazard pointer 302A from the data structure 206 by the reader thread 208A. That is, the memory-barrier instruction ensures that a processor does not reorder any outstanding read requests by the reader thread 208A relative to the removal of the hazard pointer 302A, such that all of these read requests are resolved before the hazard pointer 302A is ultimately removed. As such, executing the memory-barrier instruction prior to removal of the hazard pointer 302A ensures that the hazard pointer 302A is removed without error. The reader thread 208B is still reading the data structure 206, such that the hazard pointer 302B still points to or references the data structures 206.

The placement of a hazard pointer on a data structure may be accomplished in one embodiment by executing the following C code:

```
for(;;) {
    hazard_pointer=p;
    smp_mb( );
    if(hazard_pointer==p) {
        break;
    }
}
```

This code executes a retry loop, "for (;;)", in which a hazard pointer is attempted to be set equal to a data structure p, "hazard_pointer=p", after which a memory barrier instruction is executed, via the "smp_mb( )" primitive, to prevent subsequent memory references to the element from being reordered to precede the setting of the hazard pointer. If the set up of the hazard pointer to point to the data structure p is successful, "if (hazard_pointer=p)", then the loop breaks, "break". Otherwise, the loop continues until the hazard pointer has been successfully set up. To remove the hazard pointer from the data structure, the following C code can be executed in one embodiment:

```
smp_mb( );
hazard_pointer=NULL;
```

This code executes another memory barrier instruction, and thereafter, the code sets the hazard pointer to point to a NULL value, "hazard_pointer=NULL".

Figure 4A:
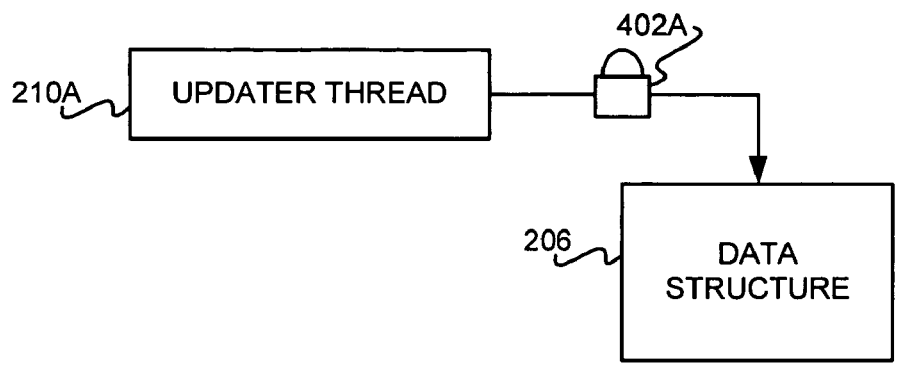
FIGS. 4A, 4B, and 4C are diagrams illustrating the utilization of locks for updating a data structure, according to an embodiment of the invention.
Figure 4B:
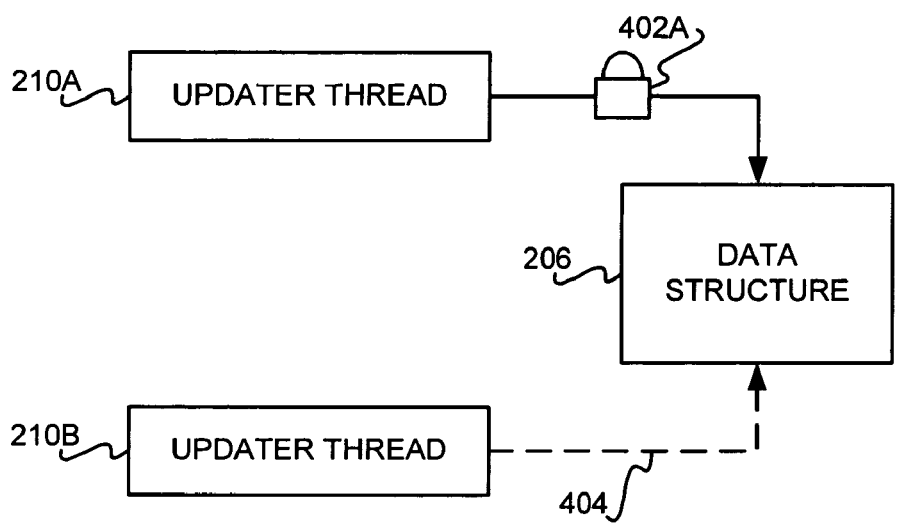
Figure 4C:
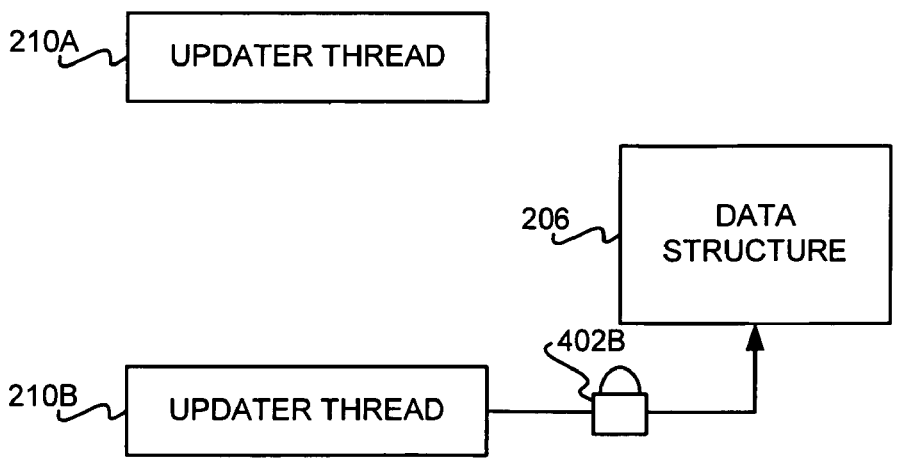

FIGS. 4A, 4B, and 4C show in an illustrative manner the utilization of locks to update the data structure 206, according to an embodiment of the invention. Updating the data structure 206 can include creating the data structure 206, as well as modifying or changing the contents of one or more elements of the data structure 206. The locks that are utilized may be spin-locks, or other types of locks, as can be appreciated by those of ordinary skill within the art. The locks referred to in FIGS. 4A, 4B, and 4C are globally acquired on the data structure 206, or can be considered global locks.

In FIG. 4A, an updater thread 210A has acquired a lock 402A on the data structure 206. Because the updater thread 210A has acquired the lock 402A on the data structure 206 in FIG. 4A, it is able to update, such as modify or change, the data structure 206.

In FIG. 4B, another updater thread 210B is attempting to update the data structure 206, as indicated by the dotted line 404. However, because the updater thread 210B has to obtain a lock on the data structure 206 before updating the data structure 206, it cannot do so. That is, because the updater thread 210A has the lock 402A on the data structure 206, the updater thread 210B cannot obtain its own lock on the data structure 206. This is because, for updating purposes, only a single updater thread can have a lock on the data structure 206 at any given time. Because the updater thread 210A already has the lock 402A on the data structure 206, the updater thread 210B cannot acquire its own lock on the data structure 206. The updater thread 210B may subsequently periodically check to see if there are no other locks on the data structure 206, or "spin" on the lock 402A, such that it is notified when the lock 402A has been released from the data structure 206.

In FIG. 4C, the updater thread 210 is finished updating the data structure 206, and has released its lock on the data structure 206. Therefore, the lock 402A of FIGS. 4A and 4B is not present in FIG. 4C. Because there are no longer any other locks on the data structure 206, the updater thread 210B can now assert its own lock 402B on the data structure 206. Since the updater thread 210 has acquired the lock 402B on the data structure 206, it is thus able to update the data structure 206 as desired.

Figure 5A:
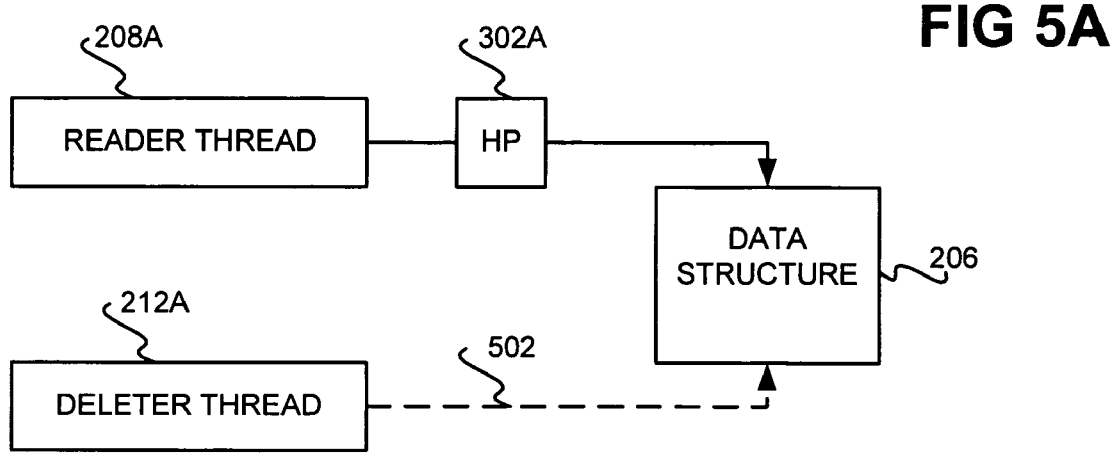
FIGS. 5A, 5B, and 5C are diagrams illustrating how a data structure can be deleted, or freed, after first determining that no hazard pointers point to the data structure, according to an embodiment of the invention.
Figure 5B:
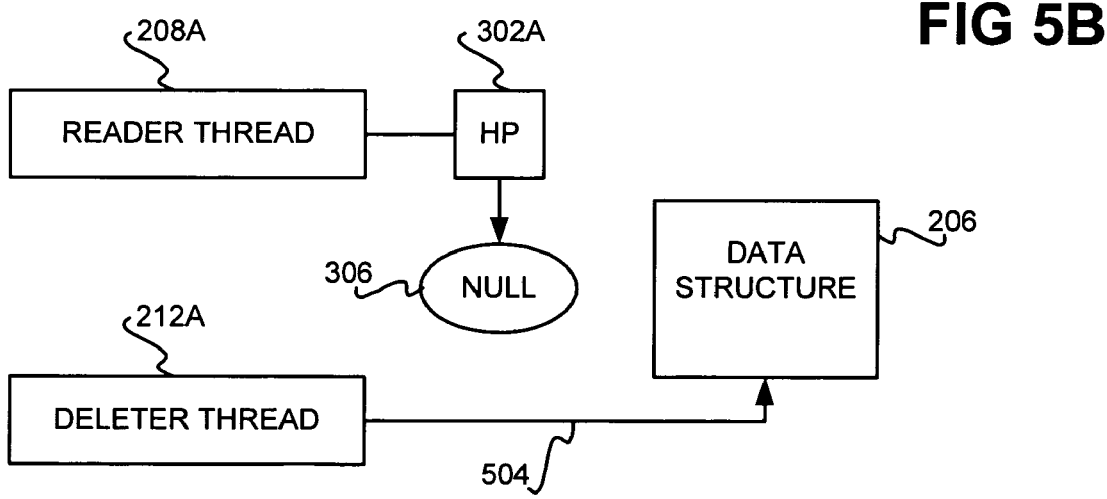
Figure 5C:
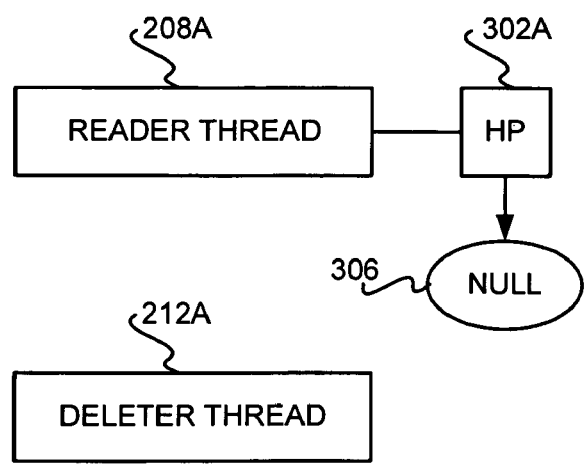

FIGS. 5A, 5B, and 5C show in an illustrative manner how the data structure 206 can be deleted or freed, according to an embodiment of the invention. In general, the data structure 206 may not be deleted where any of the reader threads 208 has a hazard pointer referencing or pointing to the data structure 206. Deleting the data structure 206 can mean that the memory resources allocated to the data structure 206 are freed for other purposes, such as for allocation to other data structures.

In FIG. 5A, the reader thread 208A has the hazard pointer 302A pointing to the data structure 206, such that an associated memory barrier instruction is executed by the reader thread 208A after the hazard pointer 302A has been set up. The setting up of the hazard pointer 302A, and the execution of the memory barrier instruction, can be accomplished by executing the C code that has been presented in relation to FIGS. 3A, 3B, and 3C. A deleter thread 212A is attempting to delete, or free, the data structure 206, as indicated by the dotted line 502. However, because it determines that there is the hazard pointer 302A referencing the data structure 206, the deleter thread 212A cannot delete, or free, the data structure 206. The deleter thread 212A thus has to wait at least until no hazard pointers point to the data structure 206 before deleting, or freeing, the data structure 206.

In FIG. 5B, the reader thread 208A has finished reading the data structure 206, and has removed the hazard pointer 302A from the data structure 206. Instead the hazard pointer 302A points to the NULL value 306. Because there are no hazard pointers pointing to or referencing the data structure 206, the deleter thread 212A can now delete, or free, the data structure 206, as indicated by the solid line 504, presuming that all data structure elements of the data structure 206 have first been removed, as has been described in relation to FIG. 1.

In FIG. 5C, after deletion by the deleter thread 212A, the data structure 206 of FIGS. 5A and 5B is no longer present. The reader thread 208A still has the hazard pointer 302A referencing or pointing to the NULL value 306. It is noted that whereas FIGS. 5A, 5B, and 5C have been described in relation to an entire data structure being deleted, alternatively just one or more elements of the data structure may be deleted.

Detailed Methods

FIG. 6A shows a method 600 for reading a data structure using hazard pointers, which is more detailed than but consistent with 102 of the method 100 of FIG. 1, according to an embodiment of the invention. The data structure is first attempted to be read by a first reader (602), such as a first reader thread. The first reader maintains a first hazard pointer to the data structure and executes a memory barrier instruction (604). Maintaining the first hazard pointer may require using a retry loop, as described above in relation to FIGS. 3A, 3B, and 3C. The first reader then reads the data structure (610).

The data structure is also attempted to be read by a second reader (612), such as a second reader thread. The second reader maintains a second hazard pointer to the data structure, and also executes a memory barrier instruction (614). Maintaining the second hazard pointer may also require using a retry loop, as described above in relation to FIGS. 3A, 3B, and 3C. Thereafter, the second reader reads the data structure (620). Thus, the method 600 shows that two, or more, readers are able to maintain hazard pointers to the same data structure at the same time. That is, even after a first reader has pointed its hazard pointer to a data structure, and before the first reader has removed its hazard pointer from the data structure, another, second reader is able to point its own hazard pointer to the same data structure.

At some point, both the first and the second readers are finished reading the data structure (622). The first reader executes another memory barrier instruction (624), and removes the first hazard pointer (626), so that it no longer points to the data structure. Similarly, the second reader executes a memory barrier instruction (628), and removes the second hazard pointer (630). As can be appreciated by those of ordinary skill within the art, the method 600 of FIG. 6A can be extended such that more than two readers are attempting to read the same data structure, where all these readers maintain hazard pointers referencing the data structure at the same time.

FIG. 6B shows a method 650 for updating and deleting (i.e., freeing) a data structure, which is more detailed than but consistent with 104 and 106 of the method 100 of FIG. 1, according to an embodiment of the invention. First, the data structure is attempted to be updated by an updater (652), such as an updater thread. The updater globally acquires a lock on the data structure (654), or, stated another way, the updater acquire a global lock on the data structure.

The updater updates the data structure as desired (656). For example, where the data structure has a number of structure elements, the updater may add or remove one or more of these elements (658). As one example, the data structure may be a hash chain or a hash table having a number of hash chain or hash table elements. In such instance, updating the data structure can include removing or adding such elements from the hash chain or table. Once updating has been finished, the lock is released from the data structure, (660).

Next, the data structure is attempted to be freed (i.e., deleted) by a deleter (662), such as a deleter thread. Freeing the data structure means that the memory allocated to the data structure is freed for use for other purposes. It is noted that all data structure elements of the data structure may first have to be removed, via the updating process of 652 that has been described, before the data structure can be freed. The deleter determines whether any hazard pointers point to the data structure (664). Checking for hazard pointers determines whether any readers are currently reading the data structure.

If no hazard pointers point to the data structure, then the data structure is freed (i.e. deleted) by the deleter thread (668). Deletion can include freeing the memory resources used by the data structure so that they can be used for other purposes. However, if one or more hazard pointers point to the data structure, then the deleter thread waits until no hazard pointers point to the data structure before deleting the data structure (670). The method 650 can also be extended to multiple updaters and multiple deleters, as can be appreciated by those of ordinary skill within the art. Furthermore, it is noted that whereas the method of FIG. 6B has been described in relation to an entire data structure being deleted, it may also be performed with respect to an element of the data structure being deleted, such that the element is first removed as an update, and then it is deleted by its allocated memory being freed.

Conclusion

The present invention provides a novel manner by which a combination of a lock-free approach, specifically hazard pointers, and a lock approach, specifically locks, are together used to manage access to data structures. In particular, the lock-free approach is used when reading the data structures, whereas the lock approach is used when writing the data structures. Therefore, the present invention is contrasted in this respect with the prior art, which requires either using a lock-free approach for both reading and writing data structures, or using a lock approach for both reading and writing data structures. The present invention thus leverages both the advantages of using a lock-free approach to accessing data structures with the advantages of using a lock approach to accessing data structures, by providing a hybrid approach that uses a lock-free approach when reading data structures and a lock approach when writing data structures.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

What is claimed is:

1. A method comprising:
    where a reader is attempting to read a data structure,
        the reader maintaining a hazard pointer to the data structure before reading the data structure, without globally acquiring a lock on the data structure;
        upon the reader being finished reading the data structure,
            removing the hazard pointer from the data structure; and,
    where an updater is attempting to update the data structure,
        the updater globally acquiring a lock on the data structure before updating the data structure;
        upon the updater being finished updating the data structure,
            releasing the lock from the data structure.

2. The method of claim 1, further comprising, to delete the data structure,
    determining whether any hazard pointers point to the data structure; and,
    where no hazard pointers point to the data structure, deleting the data structure.

3. The method of claim 2, further comprising, to delete the data structure,
    where one or more hazard pointers point to the data structure, waiting until the hazard pointers no longer point to the data structure before deleting the data structure.

4. The method of claim 2, wherein deleting the data structure comprises freeing memory resources being utilized by the data structure.

5. The method of claim 2, wherein deleting the data structure comprises deleting at least one of a plurality of data structure elements of the data structure.

6. The method of claim 1, further comprising:
    where the reader is attempting to read the data structure,
        the reader executing a memory barrier instruction.

7. The method of claim 6, further comprising, where the reader is attempting to read the data structure,
    upon the reader being finished reading the data structure,
        the reader executing another memory barrier so that the hazard pointer can be removed from the data structure without error.

8. The method of claim 1, wherein removing the hazard pointer from the data structure comprises setting the hazard pointer to a NULL value.

9. The method of claim 1, further comprising, where a second reader is attempting to read the data structure,
    the second reader maintaining a second hazard pointer to the data structure before reading data structure, without globally acquiring a lock on the data structure; and,
    upon the second reader being finished reading the data structure,
        removing the second hazard pointer from the data structure.

10. The method of claim 1, wherein the data structure comprises a plurality of data structure elements.

11. The method of claim 10, wherein the updater attempting to update the data structure comprises the updater attempting to update at least one of the data structure elements of the data structure.

12. The method of claim 10, wherein the data structure is a hash chain, and the plurality of data structure elements is a plurality of hash chain elements.

13. The method of claim 12, further comprising, where the updater is attempting to update the data structure,
    after the updater globally acquires the lock on the data structure,
        updating the data structure by at least one of adding a hash chain element to the hash chain and removing a hash chain element from the hash chain.

14. A method comprising:
    where a reader thread is attempting to read a data structure,
        the reader thread causing a hazard pointer to reference the data structure before reading the data structure, without acquiring a global lock on the data structure;
        upon the reader thread being finished reading the data structure,
            the reader thread removing the hazard pointer from the data structure; and,
    where an updater thread is attempting to update the data structure,
        the updater thread acquiring a global lock on the data structure before updating the data structure;
        upon the updater thread being finished updating the data structure,
            releasing the global lock from the data structure.

15. The method of claim 14, further comprising, where a deleter thread is attempting to delete the data structure, determining whether any hazard pointers reference the data structure; and, where no hazard pointers reference the data structure, freeing memory resources allocated to the data structure to delete the data structure.

16. The method of claim 14, wherein the updater attempting to update the data structure comprises the updater attempting to update at least one of a plurality of data structure elements of the data structure.

17. A system comprising:
at least one processor;
memory in which a data structure is stored; and,
at least one reader thread executed by the at least one processor from the memory, each reader thread to maintain a hazard pointer to the data structure before reading the data structure, without globally acquiring a lock on the data structure, the reader thread to remove the hazard pointer from the data structure after reading the data structure; and,
at least one updater thread executed by the at least one processor from the memory, each updater thread to globally acquire a lock on the data structure before updating the data structure, and to release the lock from the data structure after updating the data structure.

18. The system of claim 17, further comprising at least one deleter thread executed by the at least one processor from the memory, each deleter thread capable of deleting the data structure after first determining that no hazard pointers point to the data structure.

19. The system of claim 17, wherein each reader thread is to execute a memory barrier instruction before reading the data structure.

20. An article of manufacture comprising:
a non-transitory computer-readable medium;
means in the medium for maintaining a hazard pointer pointing to the data structure before reading the data structure without acquiring a global lock on the data structure, and for pointing the hazard pointer to a NULL value after reading the data structure;
means in the medium for acquiring a global lock on the data structure before updating the data structure, and for releasing the global lock from the data structure after updating the data structure; and,
means in the medium for deleting the data structure after first determining that no hazard pointers point to the data structure.

* * * * *